UNITED STATES PATENT OFFICE.

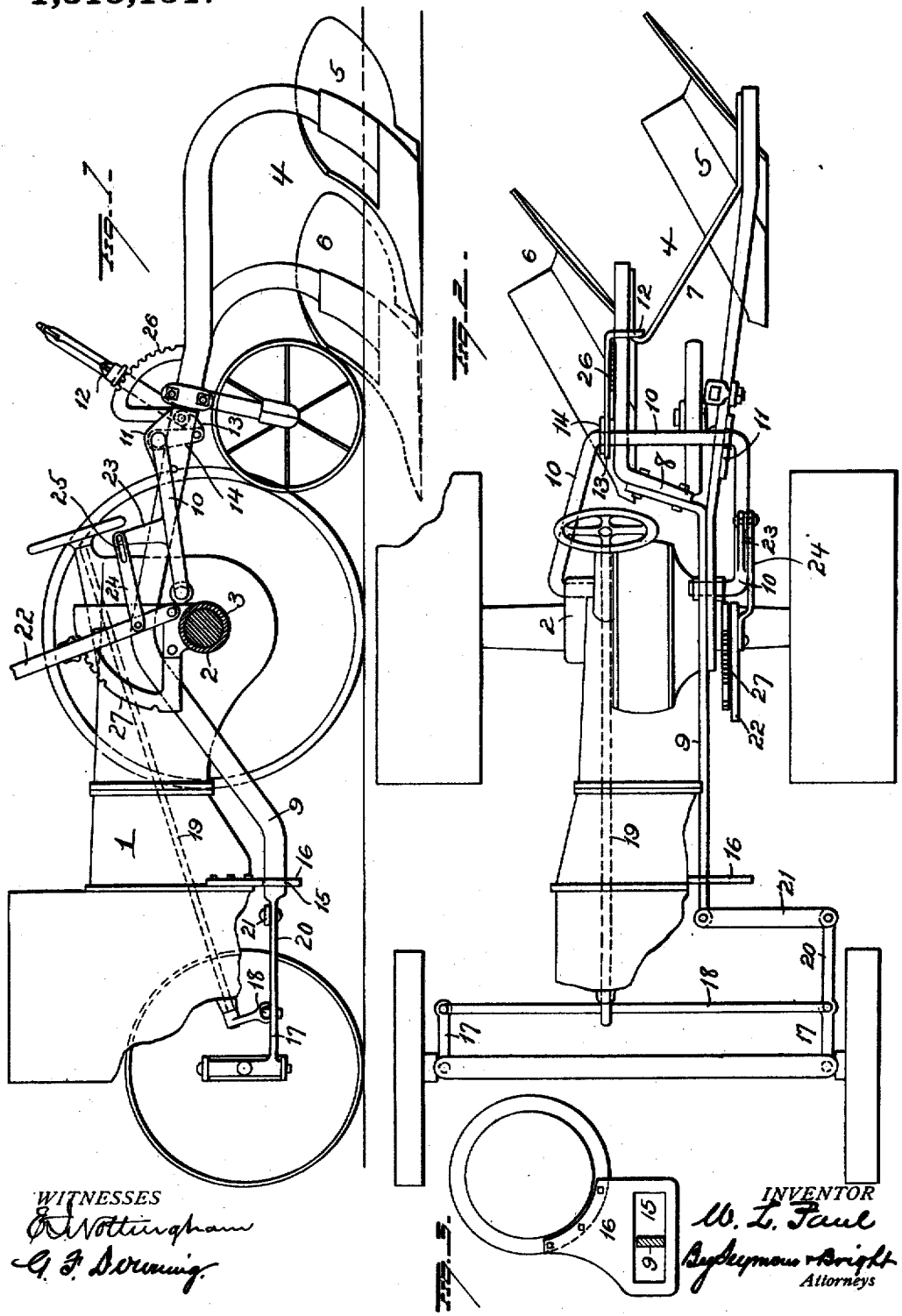

WILLIAM L. PAUL, OF SAN FRANCISCO, CALIFORNIA, ASSIGNOR TO OLIVER CHILLED PLOW WORKS, OF SOUTH BEND, INDIANA.

PLOW.

1,315,151.     Specification of Letters Patent.     Patented Sept. 2, 1919.

Application filed January 16, 1917. Serial No. 142,682.

*To all whom it may concern:*

Be it known that I, WILLIAM L. PAUL, a citizen of the United States, and a resident of San Francisco, in the county of San Francisco and State of California, have invented certain new and useful Improvements in Plows; and I do hereby declare the following to be a full, clear, and exact description of the invention, such as will enable others skilled in the art to which it appertains to make and use the same.

This invention relates to improvements in plows and more particularly to such as employ a tractor as the draft means and known in the art as "engine gang plows."

The object of my present invention is to provide simple and efficient means whereby the plow, while the base thereof is in the ground, shall be caused to properly trail in a curved direction and thereby facilitate the turning of the plow without necessity for raising the base out of the ground.

A further object is to provide means, in an engine gang plow, whereby the plow may be accurately guided simultaneously with the tractor and controlled by the same steering means as that employed to steer the tractor.

With these and other objects in view, the invention consists in certain novel features of construction and combinations of parts as hereinafter set forth and pointed out in the claims.

In the accompanying drawings, Figure 1 is a side elevation showing an engine gang plow structure embodying my improvements. Fig. 2 is a plan view of same, and Fig. 3 is a detail view.

1 represents a tractor and 2 the mounting for the rear axle 3 thereof.

In the present instance I have shown a gang plow 4 comprising two plow units 5—6 (although a greater number of plow units may be employed if desired) and the rear ends of these plow units may be rigidly connected by means of a brace 7. The beam of the plow unit 5 extends forwardly over the rear axle of the tractor while the beam of the plow unit 6 may be provided at its forward end with a lateral arm 8 prejecting toward the beam of the plow unit 6 and extended forwardly to form a beam extension 9 for the plow gang.

The side members of a draft bail 10 are pivotally connected at their forward ends to the rear axle mounting 2 of the tractor and the rear cross-bar of this draft bail is connected with the plow gang intermediate the ends of the beams of the plow units. In effecting the connection of the bail with the plow gang, the following devices may be employed: A bracket 11 is secured to and projects upwardly from the beam of the plow unit 5, said bracket having a hole through which the cross-bar of the bail passes loosely. A hand lever 12 is pivotally connected with the beam of the plow unit 6 and provided with an arm 13 depending from its pivotal support,—the arm 13 being connected with the cross bar of the bail by means of a pivoted link 14. By means of such attachment of the draft bail to the plow gang, the latter will be permitted, under certain conditions, to swing laterally on the loose mounting of the bracket 11 on the rear cross bar of the draft bail.

The forward end of the beam extension of the plow gang passes through and is guided in a horizontal elongated slot 15 in a bracket 16 secured to the tractor and depending therefrom in proximity to its forward end.

Any suitable means may be employed for steering the tractor and these means are connected with the forward end of the beam extension 9 so that when the operator manipulates the steering gear for the tractor he will also cause the plow gang to swing laterally on its loose connection with the draft bail, and cause the plow gang to accurately trail behind the tractor regardless of the direction or extent to which the tractor may be guided. In the embodiment of the invention shown in the drawings, the stub axles for the hubs of the front tractor wheels are provided with rearwardly projecting arms 17 connected by a suitable rod 18 and with the latter the steering shaft 19 is suitably connected for moving said connecting rod longitudinally to shift the front tractor wheels. One of the arms 17 is made with a rearward extension 20, with which one end of a link 21 is pivotally connected,— the other end of said link being connected with the forward end of the beam extension 9 forwardly of the slotted bracket 16.

The hand lever 12 may be employed for leveling the plow gang and a lever 22 pivoted on the rear axle mounting may be employed for raising and lowering the plow gang,—said lever 22 being connected with a post 23 on the draft bail by means of a link 24 pivoted at one end to said lever and provided, near its other end, with an elongated slot 25 to receive a pin projecting from said post on the draft bail. Notched segments 26—27 are shown to coöperate with suitable detents carried by the levers 12 and 22 for locking the same.

Various slight changes may be made in the details of construction of my invention without departing from the spirit thereof or limiting its scope and hence I do not wish to restrict myself to the precise constructive details herein set forth.

Having fully described my invention what I claim as new and desire to secure by Letters-Patent, is:

1. The combination with a tractor and steering means therefor, of a plow beam having pivotal connection between its ends with the tractor, said plow beam having its forward end portion connected with the steering means of the tractor to steer the plow and cause the same to follow the trail of the tractor when the latter travels in a curved direction.

2. The combination with a tractor and steering means therefor, of a plow comprising a base and a draft beam, a draft device connecting an intermediate portion of said draft beam of the plow with said tractor, means affording a pivotal and longitudinally movable relation between the forward portion of the plow draft beam and the tractor, and means connecting the forward portion of the plow draft beam with the steering means of the tractor.

3. The combination with a tractor and steering means therefor, of a plow comprising a base and a draft beam, draft means connecting an intermediate portion of said draft beam with the tractor, guiding means on the tractor for the forward portion of the draft beam of the plow, and means connecting the forward portion of the draft beam of the plow with the steering means of the tractor.

4. The combination with a wheeled frame having steering means, a plow comprising a base and a draft beam, and draft means connecting an intermediate portion of the draft beam of the plow with the wheeled frame, whereby said plow will trail from the wheeled frame, of means for causing lateral movement of the plow relatively to the wheeled frame when the latter moves in a curved path, said means comprising connections between the forward end portion of the draft beam of the plow and the steering means of the wheeled frame.

5. The combination with a wheeled frame, steering means therefor, a draft device pivoted to said frame, and a plow comprising a base and a draft beam, the latter being loosely connected between its ends with said draft device, of connections between the forward portion of the plow draft beam and the steering means of the wheeled frame.

6. The combination with a tractor and steering means therefor, of a plow disposed in rear of the tractor and having a beam extension connected with and guided by the forward portion of the tractor, draft means connecting the plow with the rear end of the tractor, and means connecting the forward end of the beam extension with the steering means of the tractor.

7. The combination with a tractor and a bracket secured thereto near its forward end and having a horizontal elongated slot, of a plow having a beam extension passing freely through the slot in said bracket, a draft bail pivotally connected with the rear end of the tractor and loosely connected at its rear end with the plow, and steering means for the tractor connected with the forward end of said beam extension.

8. The combination with a tractor, of a plow having a beam extension, means on the tractor for guiding the beam extension in an approximately horizontal plane, a draft device pivotally connected with the rear portion of the tractor and loosely connected with the plow, and steering means for the tractor connected with said beam extension.

In testimony whereof, I have signed this specification in the presence of two subscribing witnesses.

WILLIAM L. PAUL.

Witnesses:
LAURA JACKSON,
MILDRED BURNETT.